3,140,296
PRODUCTION OF DIOXANE DERIVATIVES
James D. McClure, San Francisco, Calif., assignor to Shell Oil Company, New York, N.Y., a corporation of Delaware
No Drawing. Filed Mar. 13, 1963, Ser. No. 264,761
11 Claims. (Cl. 260—340.6)

This invention relates to a novel process for the production of heterocyclic compounds. More particularly, it relates to a process for the production of substituted dioxanes.

Cyclodimerization of compounds containing an epoxy, i.e., oxirane, linkage, is well known in the art. The cyclodimerization of ethylene oxide, the simplest of these epoxy compounds, is readily effected by acidic catalysts, the product being 1,4-dioxane. However, when epoxides containing substituents upon the oxirane ring are similarly dimerized, the corresponding substituted 1,4-dioxanes are not produced as major products. Instead, cyclodimerization produces substituted dioxolanes as principal non-polymeric products. Thus, when propylene oxide was heated in the presence of sodium bisulfate catalyst, the principal product observed was 2-ethyl-4-methyl-1,3-dioxolane. Similarly, styrene oxide yields principally 2-benzyl-4-phenyl-1,3-dioxolane when cyclodimerized in the presence of stannic chloride. It has now been found, however, that 1,4-dioxane derivatives may be produced in satisfactory yields from cyclodimerization of certain epoxy derivatives through the choice of proper catalysts.

It is therefore a principal object of this invention to provide a novel process for the production of dioxane derivatives. A more particular object is to provide a process whereby epoxyhalo compounds are cyclodimerized to substituted 1,4-dioxanes.

These objects are accomplished by the process which comprises heating an epoxyhaloalkane in the presence of a metal carbonyl catalyst. Preferred epoxyhaloalkane reactants for the process of the present invention are the m, n-epoxy-o-haloalkanes, where m, n, and o designate three consecutively numbered carbon atoms in the alkane portion of the compound, that is the adjacent-epoxyhaloalkanes, which can be represented by the formula

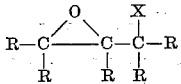

wherein each R may be hydrogen, alkyl including aralkyl or aryl including alkaryl radicals, and X is halogen. These compounds preferably contain only carbon and hydrogen atoms besides a single epoxy-oxygen and one halogen atom.

Illustrative of suitable alkyl R groups are those branched and straight-chain radicals having from 1 to 10 carbon atoms. Such radicals are exemplified by methyl, ethyl, propyl, isopropyl, n-butyl, tert-butyl, sec-butyl, hexyl, octyl and decyl radicals. Suitable aryl radicals have from 6 to 10 carbon atoms and are represented by phenyl, benzyl, xylyl, tolyl, 2,4-dimethylphenyl, α-phenylethyl, naphthyl and p-tert-butylphenyl radicals. Preferred R groups in the epoxyhaloalkanes of the invention are hydrogen and lower straight-chain alkyl radicals having from 1 to 4 carbon atoms. Particularly preferred for the ease of reaction and the desirable properties of the products obtained therefrom are the epoxyhaloalkanes wherein all R groups are hydrogen, e.g., the epihalohydrins.

Although the cyclodimerization process of the present invention is operable when the reactant epoxyhaloalkane contains fluorine or iodine as the halogen, it is preferred that the X group in the above-depicted formula be halogen of atomic number from 17 to 35, i.e., chlorine and bromine, and epoxyhaloalkanes wherein said halogen is chlorine or bromine are preferred.

Illustrative of epoxyhaloalkanes are 1-chloro-2,3-epoxy-3-phenylpropane; 3-chloro-4,5-epoxyoctane; 2-bromo-3-benzyl-3,4-epoxyhexane; 3-iodo-4,5-epoxy-2,6,6-trimethylheptane and 2-fluoro-3,4-epoxy-4-methyl-1-phenylpentane. Epoxyhaloalkanes of the preferred class include epichlorohydrin; epibromohydrin; 2-chloro-3,4-epoxyhexane; 1-bromo-2,3-epoxybutane; 1-chloro-2,3-epoxy-2-ethylpropane; 1-chloro-2,3-epoxypentane; 2-chloro-3,4-epoxy-2,3-dimethylpentane and the like.

The epoxyhaloalkane is dimerized in the liquid phase. In one modification, a solvent is employed. Suitable solvents for reaction in solution are those solvents unreactive toward the epoxyhaloalkane and that are liquid at reaction temperature and pressure. Exemplary solvents include the tertiary alcohols, e.g., tert-butyl alcohol, tert-amyl alcohol and diethylmethyl carbinol; ethers such as diethyl ether, dibutyl ether, methyl hexyl ether, dioxane, 1,3-dioxolane, tetrahydrofuran, tetrahydropyran, anisole and lower alkyl ethers of ethylene glycol, diethylene glycol, tetraethylene glycol and glycerol wherein the alkyl group has from 1 to 4 carbon atoms; esters including ethyl acetate, propyl butyrate, butyl acetate, hexyl propionate, and phenyl acetate; and the hydrocarbons such as hexane, octane, pentane, isooctane, benzene, toluene, xylene, cyclohexane, cyclopentane, tetralin and decalin. When solvents are employed, best results are obtained by the use of hydrocarbon solvents.

It is equivalently useful, however, to conduct the dimerization reaction in the absence of solvent, as by heating a mixture of the epoxyhaloalkane and the catalyst.

Catalysts that are useful in the process of the invention are modified metal carbonyls, such as cobalt carbonyls containing at least one tertiary phosphine molecule as a ligand, particularly modified dimetal octacarbonyls, e.g., dicobalt octacarbonyl. While derivatives such as acetylene dicobalt hexacarbonyl, $(HC\equiv CH)Co_2(CO)_6$, are useful, catalysts wherein two CO ligands of dicobalt octacarbonyl have been replaced by tertiary phosphine ligands have been found to be the most suitable. Such catalysts are represented by the formula $(R'R''R''P)_2Co_2(CO)_6$ wherein R' and R'' are selected independently from alkyl radicals having 1 to 10 carbon atoms and aryl radicals having from 6 to 10 carbon atoms, with the proviso that both R'' radicals may together form a divalent alkylene radical having from 1 to 6 carbon atoms. Thus, preferred catalyst types are illustrated by $(R'R'R''P)_2Co_2(CO)_6$ and $(R'R'P—R''—PR'R')Co_2(CO)_6$ wherein R' and R'' have the above significance. Preferred R' and monovalent R'' radicals in catalysts of these types are alkyl having from 1 to 6 carbon atoms.

Exemplary modified dicobalt octacarbonyl catalysts containing bidentate tertiary phosphine ligands are [2-(dimethylphosphino)ethyldimethylphosphine] dicobalt hexacarbonyl; [3-(di-n-butylphosphino)-propyldi-n-butylphosphine] dicobalt hexacarbonyl; and [4-(diphenylphosphino)butyldibutyl] dicobalt hexacarbonyl. The preferred catalyst type, however, contains two tertiary phosphine ligands that are not joined by an alkylene bridge. This preferred class of catalysts is exemplified by bis(tri-n-butylphosphine) dicobalt hexacarbonyl; bis(triphenylphosphine) dicobalt hexacarbonyl; bis(triethylphosphine) dicobalt hexacarbonyl; (tri-n-butylphosphine)(triphenylphosphine) dicobalt hexacarbonyl and (dipropylbenzylphosphine)(tripropylphosphine) dicobalt hexacarbonyl. Particularly preferred catalysts are those wherein the phosphine ligands contain only alkyl radicals of from 1 to 6 carbon atoms and especially preferred is bis(tri-n-butylphosphine) dicobalt hexacarbonyl.

The modified metal carbonyl is employed in catalytic amount. Generally, amounts of catalyst from about 0.1% to about 5% by weight based upon the epoxyhaloalkane are sufficient, while catalyst concentrations of from about 0.5% to 2% by weight on the same basis are to be preferred.

Highest conversions of epoxyhaloalkane are obtained when a promoter is added to the reaction mixture. Promoters found to be effective are quaternary ammonium halides, preferably halides wherein the halogen has an atomic number from 17 to 35. For best results, one radical attached to the tetravalent nitrogen should correspond to the radical obtained by removal of the halogen from the epoxyhaloalkane whose cyclodimerization is desired, although quaternary ammonium halides wherein one radical thereof is epoxy-substituted are in general satisfactory. For example, optimum conversions in the cyclodimerization of epichlorohydrin are obtained through the use of a glycidyl-substituted quaternary ammonium salt. The remaining valences of the tetravalent nitrogen atom are preferably satisfied with alkyl radicals, especially those alkyl radicals having from 1 to 12 carbon atoms. Examples of other epoxyhaloalkanes and suitable promoters for the cyclodimeridation thereof are shown in Table 1.

TABLE 1

| Epoxyhaloalkane | Promoter |
| --- | --- |
| Epibromohydrin | Glycidyltriethylammonium bromide. |
| 1-chloro-2,3-epoxybutane | 1-(2,3-epoxybutyl)trimethylammonium chloride. |
| 2-chloro-3,4-epoxyhexane | 2-(3,4-epoxyhexyl)lauryldimethylammonium chloride. |
| 3-bromo-4,5-epoxy-6-phenylhexane | 3-(4,5-epoxy-6-phenylhexyl)diethylpropylammonium bromide. |
| 1-iodo-2,3-epoxy-2-methylpentane | 1-(2,3-epoxy-2-methylamyl)tributylammonium iodide. |
| Epichlorohydrin | Glycidyldihexyldecylammonium chloride. |

The promoter may be added to the reaction mixture as a preformed material, but it is also useful to prepare the promoter in situ. Such a technique involves the addition of a tertiary amine or a quaternary ammonium halide to the mixture of epoxyhaloalkane and catalyst. Initial reaction of the amine with the epoxyhaloalkane forms the epoxyalkyltrialkylammonium halide which serves as the promoter.

Illustrative of trialkylamines that are useful for the in situ formation of promoters are trimethylamine, triethylamine, dimethylhexylamine, diethyllaurylamine, ethylbutyloctylamine, dipropyldecylamine and dibutylheptyl amine. The amines employed for this purpose, like the quaternary ammonium halides formed therefrom, preferably are those trialkylamines wherein each alkyl group has from 1 to 12 carbon atoms, although especially preferred are those amines wherein each alkyl group has from 1 to 4 carbon atoms.

Whether the promoter is added as a preformed material, or prepared in situ, catalytic quantities of promoter are usually sufficient. Although no apparent detriment arises from using larger amounts of promoter, concentrations of from 0.1% to 10% by weight based upon epoxyhaloalkane are generally satisfactory, with concentrations of from about 0.5% to about 5% by weight on the same basis being preferred.

The temperature at which the reaction is most efficiently conducted will depend upon the particular catalyst and epoxyhaloalkane employed. In general, reaction temperatures of from about 50° C. to about 200° C. are satisfactory while temperatures from about 100° C. to about 150° C. are preferred. It is further desirable to conduct the reaction in an inert atmosphere so as to exclude oxygen that may interfere with product yield. Thus, the reaction is normally conducted under an inert gas such as nitrogen, argon, helium and the like. The reaction is complete after a period of several hours, and the product is then recovered by such conventional means as fractional distillation or selective extraction.

The products of the cyclodimerization reaction are dioxanes represented by the formula

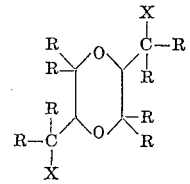

wherein R and X have the previously stated significance. Illustrative of the products formed by the process of the present invention are 2,5-bis-(chloromethyl)-1,4-dioxane; 2,5-bis(bromomethyl)-1,4-dioxane; 2,5-bis(1-chloropropyl)-1,4-dioxane; 2,5-bis(chloromethyl)-3,6-diethyl-1,4-dioxane; 2,5-bis(1-chloro-2-phenylethyl)-1,4-dioxane; 2,5-bis(bromomethyl)-3,3,6,6-tetramethyl-1,4-dioxane; 2,5-bis(1 - fluorobutyl)-2,5-dimethyl-1,4-dioxane; 2,5-bis(1-iodopropyl) - 3,6 - dibenzyl-1,4-dioxane; and 2,5-bis(1-chlorohexyl)-2,5-diethyl-3,6-dimethyl-1,4-dioxane.

It will be apparent from consideration of the dioxane structure previously depicted that geometric isomers may result from the cyclodimerization reaction. Thus, from dimerization of epichlorohydrin, there is obtained a mixture of cis- and trans-2,5-bis(chloromethyl)-1,4-dioxane. It is possible to separate the isomer mixture, as by fractional distillation or fractional crystallization, but for most purposes, the isomer mixture is useful without such separation.

The 2,5-bis(haloalkyl)-1,4-dioxanes find utility as chemical intermediates in the formation of a number of useful products. For example, reaction of 2,5-bis(chloromethyl)-1,4-dioxane with thioacetate salts in methanol results in the formation of the correesponding dithiol which has found utility as a curing agent in the production of epoxy resins. Alternatively the bis(haloalkyl)-dioxanes may be converted to the corresponding amino derivatives, which are also useful as curing agents. The bis(haloalkyl)-dioxanes have utility as plasticizers for polyvinylic materials and are useful as germicides, fungicides and the like.

To illustrate the novel process of the invention, the following examples are provided. It should be understood that they are not to be regarded as limitations, as the teachings thereof may be varied as will be understood by one skilled in this art.

*Example I*

A mixture of 93 g. of epichlorohydrin, 1.5 g. of calcium carbide added as a drying agent, 2.0 g. of bis(tri-n-butylphosphine) dicobalt hexacarbonyl and 1 g. of glycidyltrimethylammonium chloride in a 400 ml. glass-lined reactor sealed under nitrogen was maintained at 120° for three hours. The green colored product was diluted with methylene chloride and filtered to remove calcium carbide. Low boiling fractions were removed by distillation under reduced pressure at 45° C.

The residual product was diluted with 500 ml. of ether, filtered, washed with dilute sulfuric acid and dilute sodium bicarbonate and dried. Removal of the ether from the yellow solution gave 81 g. of product which partially crystallized on standing. The material was diluted with 50 ml. of cold ethanol and filtered at 0° C. to remove 15.5 g. of crystals which analysis by gas liquid chromatography indicated to be 90% trans- and 10% cis-2,5-bis(chloromethyl) - 1,4-dioxane. Recrystallization from ethanol afforded the trans isomer, M.P. 109–110° C. in greater than 99% purity.

Distillation of the filtrate through a small column gave several mixtures of cis and trans products. The cut boiling between 67–75° C. at 0.5 mm. was recrystallized from ethanol to give 14 g. of crystals of which 80% was the cis product. Sublimation of these crystals afforded, inter alia, an end fraction, M.P. 65–66° C., that contained the cis isomer in a purity greater than 99%; this is believed to be a novel product.

Overall, a yield of 21% trans- and 19% cis-2,5-bis-(chloromethyl)-1,4-dioxane was obtained.

|  | Calculated Analysis for $C_6H_{10}O_2Cl_2$ | Found, cis | Found, trans |
|---|---|---|---|
| Percent C | 38.9 | 38.7 | 39.0 |
| Percent H | 5.4 | 5.4 | 5.5 |
| Percent Cl | 38.4 | 38.3 | 38.4 |
| Molecular weight | 185 | 182 | 183 |

*Example II*

Following the procedure of Example I, 60 g. of epichlorohydrin, 2 g. of bis(tributylphosphine) dicobalt hexacarbonyl, 1 g. of glycidyltrimethylammonium chloride and 120 ml. of solvent were heated under nitrogen at 130° C. for 4–5 hours. In all cases, a mixture of cis- and trans - 2,5 - bis(chloromethyl)-1,4-dioxane was obtained. The results are summarized in Table 2.

TABLE 2

| Solvent | Percent Conversion | Yield of Dioxane |
|---|---|---|
| Cyclohexane | 88 | 38 |
| Benzene | 84 | 35 |
| Tetrahydrofuran | 55 | 32 |

Similar results are obtained when 1-bromo-2,3-epoxybutane is dimerized.

*Example III*

When epibromohydrin is heated at 100° C. for 4 hours in the presence of [4-(di-n-butylphosphino)-butyldi-n-butylphosphine] dicobalt hexacarbonyl, good yields of cis- and trans-2,5-bis(bromomethyl)-1,4-dioxane are obtained.

*Example IV*

Good yields of 2,5-bis(1-chloroethyl)-3,6-dimethyl-1,4-dioxane are obtained when 2-chloro-3,4-epoxypentane is cyclodimerized by heating in the presence of bis(triethylphosphine) dicobalt hexacarbonyl and triethyl amine.

*Example V*

When a solution of 1-chloro-2,3-epoxy-3-phenylpropane in benzene is heated at 150° C. for 6 hours in the presence of bis(triphenylphosphine) dicobalt hexacarbonyl, good yields of 2,5-bis(chloromethyl)-3,6-diphenyl-1,4-dioxane are obtained upon work-up.

I claim as my invention:

1. The process for the production of 2,5-bis(haloalkyl) - 1,4 - dioxanes which comprises cyclodimerizing epoxyhaloalkane of the formula $$R-\underset{R}{\overset{O}{\underset{|}{C}}}-\underset{R}{\overset{|}{\underset{|}{C}}}-\underset{R}{\overset{X}{\underset{|}{C}}}-R$$

wherein R is selected from the group consisting of hydrogen, alkyl radicals having 1 to 10 carbon atoms and aryl radicals having 6 to 10 carbon atoms and X is halogen, in the presence of a tertiary phosphine cobalt carbonyl catalyst.

2. The process of claim 1 wherein the catalyst is bis-(trialkylphosphine) dicobalt hexacarbonyl.

3. The process of claim 1 wherein the catalyst is bis-(tri-n-butylphosphine) dicobalt hexacarbonyl.

4. The process for the production of 2,5-bis(haloalkyl)-1,4-dioxanes which comprises cyclodimerizing epoxyhaloalkane of the formula $$R-\underset{R}{\overset{O}{\underset{|}{C}}}-\underset{R}{\overset{|}{\underset{|}{C}}}-\underset{R}{\overset{X}{\underset{|}{C}}}-R$$

wherein R is selected from the group consisting of hydrogen, alkyl radicals having from 1 to 10 carbon atoms and aryl radicals having from 6 to 10 carbon atoms and X is halogen, in the presence of bis(tertiary phosphine) dicobalt hexacarbonyl and epoxyalkyltrialkylammonium halide.

5. The process for the production of 2,5-bis(haloalkyl) - 1,4 - dioxanes which comprises cyclodimerizing epoxyhaloalkane of the formula $$R-\underset{R}{\overset{O}{\underset{|}{C}}}-\underset{R}{\overset{|}{\underset{|}{C}}}-\underset{R}{\overset{X}{\underset{|}{C}}}-R$$

wherein R is selected from the group consisting of hydrogen, alkyl radicals having from 1 to 10 carbon atoms and aryl radicals having from 6 to 10 carbon atoms and X is halogen, in the presence of bis(tertiary phosphine) dicobalt hexacarbonyl and epoxyalkyltrialkylammonium halide wherein said epoxyalkyl radical corresponds to that radical obtained by removal of said X substituent from said epoxyhaloalkane.

6. The process of claim 5 wherein the bis(tertiary phosphine) dicobalt hexacarbonyl is bis(trialkylphosphine) dicobalt hexacarbonyl.

7. The process for the production of 2,5-bis(halomethyl) - 1,4 - dioxane which comprises cyclodimerizing epihalohydrin in the presence of bis(trialkylphosphine) dicobalt hexacarbonyl.

8. The process of claim 7 wherein the epihalohydrin is epichlorohydrin.

9. The process for the production of 2,5-bis(chloromethyl) - 1,4 - dioxane which comprises cyclodimerizing epichlorohydrin in the presence of bis(trialkylphosphine) dicobalt hexacarbonyl and glycidyltrialkylammonium chloride.

10. The process of claim 9 wherein the bis(trialkylphosphine) dicobalt hexacarbonyl is bis(tri-n-butylphosphine) dicobalt hexacarbonyl.

11. The process for the production of 2,5-bis(chloromethyl) - 1,4 - dioxane which comprises cyclodimerizing epichlorohydrin in the presence of bis(tri-n-butylphosphine) dicobalt hexacarbonyl and glycidyltrimethylammonium chloride.

No references cited.